(12) United States Patent
Mayer et al.

(10) Patent No.: US 9,846,807 B1
(45) Date of Patent: Dec. 19, 2017

(54) DETECTING EYE CORNERS

(71) Applicant: MorphoTrust USA, LLC, Billerica, MA (US)

(72) Inventors: Joseph Mayer, Wayne, NJ (US); Brian Martin, McMurray, PA (US)

(73) Assignee: MorphoTrust USA, LLC, Billerica, MA (US)

( * ) Notice: Subject to any disclaimer, the term of this patent is extended or adjusted under 35 U.S.C. 154(b) by 11 days.

(21) Appl. No.: 14/986,427

(22) Filed: Dec. 31, 2015

Related U.S. Application Data

(60) Provisional application No. 62/098,883, filed on Dec. 31, 2014.

(51) Int. Cl.
*G06K 9/00* (2006.01)
*G06K 9/62* (2006.01)
(Continued)

(52) U.S. Cl.
CPC ....... *G06K 9/0061* (2013.01); *G06K 9/00604* (2013.01); *G06K 9/4609* (2013.01);
(Continued)

(58) Field of Classification Search
CPC .......... G06K 9/00248; G06K 9/00281; G06K 9/6292; G06K 9/0061; G06K 9/2018; G06K 9/00604; G06K 9/00308; G06K 9/00288; G06K 9/6255; G06K 9/00617; G06K 9/60; G06K 9/00906; G06K 9/00912; G06K 9/00268; G06K 9/4642; G06K 9/6256; G06K 9/78; G06K 9/46; G06K 9/4652; G06K 9/605; A61B 3/113; A61B 5/18; A61B 3/1216; G02B 27/0093;
(Continued)

(56) References Cited

U.S. PATENT DOCUMENTS

| | | | |
|---|---|---|---|
| 7,957,555 B2 * | 6/2011 | Ioffe | G06K 9/00248 382/103 |
| 8,007,106 B2 | 8/2011 | Wong et al. | |

(Continued)

FOREIGN PATENT DOCUMENTS

| CA | 2236082 C | 10/2001 |
|---|---|---|
| CA | 2741894 | 6/2010 |

OTHER PUBLICATIONS

Office Action in U.S. Appl. No. 14/986,261, dated Nov. 30, 2016, 14 pages.
(Continued)

*Primary Examiner* — Aklilu Woldemariam
(74) *Attorney, Agent, or Firm* — Fish & Richardson P.C.

(57) ABSTRACT

A method and system for detecting eye corners using neural network classifiers is described. After an eye image is received, the eye image may be processed by at least two neural network classifiers including an inner eye corner neural network classifier and an outer eye corner neural network classifier. The neural network classifiers provide periocular information including a distance or coordinates of an eye corner location from a center of an iris of the eye, and an outcome of whether the eye corner is an inner eye corner or an outer eye corner. Output from the various neural network classifiers are combined to generate a decision on the location of eye corners in an eye image.

20 Claims, 14 Drawing Sheets

(51) Int. Cl.
  *G06K 9/46* (2006.01)
  *G06K 9/66* (2006.01)
  *G06T 7/00* (2017.01)
(52) U.S. Cl.
  CPC ......... *G06K 9/6203* (2013.01); *G06K 9/6267* (2013.01); *G06K 9/66* (2013.01); *G06T 7/0042* (2013.01); *G06T 7/0081* (2013.01); *G06K 9/00* (2013.01)
(58) Field of Classification Search
  CPC ........ G06F 3/013; G06F 1/1686; G06T 11/00; G06T 2207/30201; G06T 7/73; G06T 7/68; G06T 2207/10016; G06T 1/20; G06T 2207/20072; G06T 2207/20081; G06T 11/60; G06T 15/04; G06T 19/00; G06T 2207/20124; G06T 7/11; G06T 7/149; G06T 7/143; H04N 5/23219; H04N 5/23229; H04N 1/624; H04N 5/2351; G08B 21/06; A45D 44/005; A61Q 1/10
  USPC ....... 382/103, 104, 117, 118, 190, 218, 296, 382/173, 195
  See application file for complete search history.

(56) References Cited

U.S. PATENT DOCUMENTS

| | | | | |
|---|---|---|---|---|
| 8,317,325 | B2* | 11/2012 | Raguin | G06K 9/0061 |
| | | | | 351/205 |
| 8,331,630 | B2 | 12/2012 | Nakanishi et al. | |
| 8,442,276 | B2 | 5/2013 | Hamza | |
| 8,452,131 | B2 | 5/2013 | Connell, II | |
| 9,141,875 | B2 | 9/2015 | Wolf et al. | |
| 9,177,202 | B2* | 11/2015 | Hanita | G06K 9/00604 |
| 9,335,820 | B2 | 5/2016 | Wolf et al. | |
| 9,563,805 | B2 | 2/2017 | Cheung et al. | |
| 2005/0117802 | A1* | 6/2005 | Yonaha | G06K 9/00597 |
| | | | | 382/173 |
| 2005/0270386 | A1 | 12/2005 | Saitoh et al. | |
| 2006/0222212 | A1 | 10/2006 | Du | |
| 2007/0147661 | A1* | 6/2007 | Fukaya | G06K 9/00248 |
| | | | | 382/104 |
| 2007/0230797 | A1* | 10/2007 | Hisanaga | A61B 3/113 |
| | | | | 382/195 |
| 2008/0238694 | A1* | 10/2008 | Ishida | A61B 5/18 |
| | | | | 340/575 |
| 2009/0220126 | A1 | 9/2009 | Claret-Tournier | |
| 2009/0220156 | A1* | 9/2009 | Ito | G06K 9/00248 |
| | | | | 382/201 |
| 2009/0273687 | A1* | 11/2009 | Tsukizawa | G06F 3/012 |
| | | | | 348/222.1 |
| 2010/0026955 | A1* | 2/2010 | Fisher | G02C 13/003 |
| | | | | 351/205 |
| 2010/0027890 | A1 | 2/2010 | Yoshinaga | |
| 2010/0110374 | A1* | 5/2010 | Raguin | A61B 3/1216 |
| | | | | 351/206 |
| 2010/0172584 | A1* | 7/2010 | Lukac | G06K 9/0061 |
| | | | | 382/167 |
| 2011/0081089 | A1* | 4/2011 | Mori | G06K 9/00281 |
| | | | | 382/218 |
| 2011/0142297 | A1 | 6/2011 | Yu | |
| 2012/0189160 | A1* | 7/2012 | Kaneda | A61B 3/113 |
| | | | | 382/103 |
| 2013/0169827 | A1* | 7/2013 | Santos | H04N 5/23229 |
| | | | | 348/207.1 |
| 2013/0236067 | A1 | 9/2013 | Savvides | |
| 2015/0023603 | A1* | 1/2015 | Whitehill | G06K 9/6292 |
| | | | | 382/195 |
| 2016/0063303 | A1* | 3/2016 | Cheung | A61B 3/113 |
| | | | | 382/103 |

OTHER PUBLICATIONS

John Daugman, "How Iris Recognition Works" IEEE Transactions on Circuits and Systems for Video Technology, vol. 14, No. 1, Jan. 2004.

Gil Santos, Hugo Proenca, "A Robust Eye-Corner Detection Method for Real-World Data"; Biometrics (IJCB), 2011 International Joint Conference on Biometrics Compendium, IEEE, Oct. 11-13, 2011.

* cited by examiner

DETECTING EYE CORNERS

CROSS REFERENCE TO RELATED APPLICATION

This application claims the benefit of U.S. provisional patent application No. 62/098,883, filed on Dec. 31, 2014, which is incorporated by reference herein in its entirety.

FIELD

This disclosure generally relates to processing eye images.

BACKGROUND

Existing eye image processing techniques may consume significant resources and can be computationally and financially expensive. For example, eye corner and iris detection techniques often utilize a brute force method using multiple likely eye corner location templates and iris rotations, which can take up significant computational resources and time. Accordingly, alternative methods for processing eye images are needed.

SUMMARY

This disclosure generally describes detection of eye corners using neural network classifiers. After an eye image is received, the eye image may be processed by at least two neural network classifiers including an inner eye corner neural network classifier and an outer eye corner neural network classifier. The neural network classifiers provide periocular information including a distance or coordinates of an eye corner location from a center of an iris of the eye, and an outcome of whether the eye corner is an inner eye corner or an outer eye corner. Output from the various neural network classifiers are combined to generate a decision on the location of eye corners in an eye image.

Implementations disclosed herein may generate accurate outputs, while maintaining a level of simplicity and robustness. Eye image processing systems and methods may be implemented without incurring complexity, and becoming vulnerable to anomalies and variances (e.g., lighting, eye lash presence, environmental conditions).

Innovative aspects of the subject matter described in this specification may, in some implementations, be embodied in a computer-implemented method that includes actions of detecting an eye image in an image, classifying an inner eye corner in the eye image using one or more of a plurality of classifiers coupled to a processor, determining one or more relative displacements of the inner eye corner from an iris in the eye image based on the classification of the inner eye corner, classifying an outer eye corner in the eye image using one or more of the plurality of classifiers coupled to the processor, determining one or more relative displacements of the outer eye corner from the iris in the eye image based on the classification of the outer eye corner, and identifying, using the processor, a location of the inner eye corner based on the determined relative displacements of the inner eye corner and a location of the outer eye corner based on the determined relative displacements of the outer eye corner.

In some implementations, a non-transitory computer-readable storage medium is provided and includes instructions, which, when executed by one or more computers, cause the one or more computers to perform actions. The actions include detecting an eye image in an image, classifying an inner eye corner in the eye image using one or more of a plurality of classifiers, determining one or more relative displacements of the inner eye corner from an iris in the eye image based on the classification of the inner eye corner, classifying an outer eye corner in the eye image using one or more of the plurality of classifiers, determining one or more relative displacements of the outer eye corner from the iris in the eye image based on the classification of the outer eye corner, and identifying a location of the inner eye corner based on the determined relative displacements of the inner eye corner and a location of the outer eye corner based on the determined relative displacements of the outer eye corner.

In some implementations, a system includes one or more computers and one or more storage devices storing instructions that are operable and when executed by one or more computers, cause the one or more computers to perform actions. The actions include detecting an eye image in an image, classifying an inner eye corner in the eye image using one or more of a plurality of classifiers, determining one or more relative displacements of the inner eye corner from an iris in the eye image based on the classification of the inner eye corner, classifying an outer eye corner in the eye image using one or more of the plurality of classifiers, determining one or more relative displacements of the outer eye corner from the iris in the eye image based on the classification of the outer eye corner, and identifying a location of the inner eye corner based on the determined relative displacements of the inner eye corner and a location of the outer eye corner based on the determined relative displacements of the outer eye corner.

Other implementations of these aspects include corresponding systems, apparatus, computer-readable storage mediums, and computer programs configured to implement the actions of the above-noted method.

These and other implementations may each optionally include one or more of the following features. For instance, in some implementations, the actions further include dividing the eye image into a plurality of regions of interest. Each of the regions of interest are processed by the one or more of the plurality of classifiers to classify the inner eye corner or the outer eye corner.

In some implementations, identifying, using the processor, the location of the inner eye corner based on the determined relative displacements of the inner eye corner and the location of the outer eye corner based on the determined relative displacements of the outer eye corner includes determining an average displacement of the inner eye corner from the iris in the eye image based on the relative displacements of the inner eye corner provided by the one or more of the plurality of classifiers, and determining an average displacement of the outer eye corner from the iris in the eye image based on the relative displacements of the outer eye corner provided by the one or more of the plurality of classifiers.

In some implementations, identifying, using the processor, the location of the inner eye corner based on the determined relative displacements of the inner eye corner and the location of the outer eye corner based on the determined relative displacements of the outer eye corner includes determining whether the average displacement of the inner eye corner from the iris in the eye image satisfies a threshold, and identifying the location of the inner eye corner based on the average displacement of the inner eye corner from the iris in the eye image satisfying the threshold.

In some implementations, identifying, using the processor, the location of the inner eye corner based on the determined relative displacements of the inner eye corner and the location of the outer eye corner based on the determined relative displacements of the outer eye corner includes determining whether the average displacement of the outer eye corner from the iris in the eye image satisfies a threshold, and identifying the location of the outer eye corner based on the average displacement of the outer eye corner from the iris in the eye image satisfying the threshold.

In some implementations, the actions further include receiving the image from an image acquisition device, and processing the eye image to center the iris of an eye imaged by the eye image.

In some implementations, the plurality of classifiers includes a plurality of neural network classifiers, respectively.

The details of one or more implementations are set forth in the accompanying drawings and the description below. Other features and advantages will become apparent from the description, the drawings, and the claims.

BRIEF DESCRIPTION OF THE DRAWINGS

Like reference numbers and designation in the various drawings indicate like elements.

DETAILED DESCRIPTION

Figure 1:
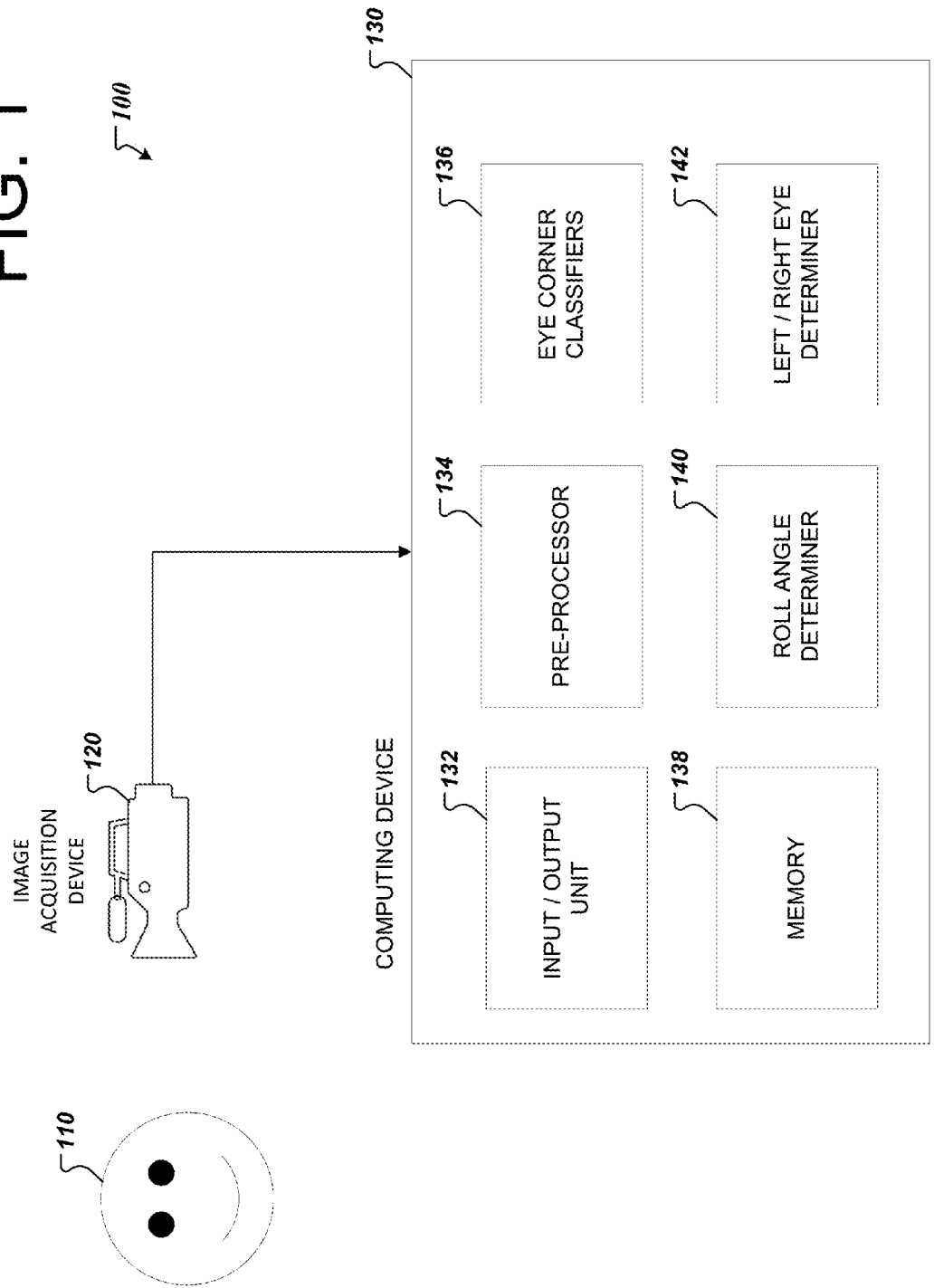
FIG. 1 depicts a system for processing eye images.

This disclosure generally describes methods and systems for eye image processing. An exemplary system 100 may include an image acquisition device (IAD) 120 to obtain an image or video of a subject 110 and a computing device 130. The computing device 130 may include or be coupled to an Input/Output Unit 132, a pre-processor 134, an eye corner classifier 136, a memory 138, a roll angle determiner 140, and a left/right eye determiner 142.

The IAD 120 can be used to obtain an image of subject 110 through various suitable methods. In some implementations, the IAD 120 may include a camera, a camcorder, a charge-coupled device (CCD), or optical sensor to capture an image of the subject 110. In general, the IAD 120 may be any suitable device configured to obtain a moving image or a still image. In some implementations, the IAD 120 may communicate with memory 138 or an external device to obtain an image.

In some implementations, the IAD 120 may also include one or more image processing tools such as a cropping tool or a selection tool, whereby a portion of an image or a particular frame of a video can be selected. For example, an operator of the IAD 120 may select a particular frame of a video and, within the frame, crop the image to include only eye images of a person. The images acquired and/or selected by the IAD 120 may be transmitted to computing device 130.

In some implementations, the IAD 120 may include an illumination source that generates and emits a radiation signal in the direction of the subject. The radiation signal may have various suitable frequencies. The radiation signal may include, for example, an infrared (IR) signal, an ultraviolet (UV) signal, a laser signal, or a visible light signal. The IAD 120 may receive a reflection of a signal output by the illumination source. The reflection may include data associated with an eye image or subject 110.

If the illumination source outputs a laser signal, the illumination source may be an excimer laser or any other suitable laser (e.g., argon-fluorine laser) depending on the desired wavelength of the laser signal. If the illumination source outputs a visible light signal, the illumination source may be any device (e.g., light-emitting diode) that generates a visible light signal. If the illumination source outputs an IR or UV signal, the illumination source may include a laser or lamp that outputs IR or UV signals, respectively.

The subject 110 may, in general, by any physical and tangible object. an image of the subject 110 may include, for example, an image of a person, a person's face, or a person's eyes.

Computing device 130 may include an image processor, and may communicate with IAD 120 through various suitable means. For example, the IAD 120 may be connected to the computing device 130 by a wired or wireless network or may communicate with the computing device 130 through a suitable messaging functionality such as e-mail, Short Message Service (SMS) messaging, and text messaging. As described below, the computing device 130 may include various suitable hardware and software components to process an eye image. The computing device 130 may include or be coupled to an Input/Output Unit 132, a pre-processor 134, an eye corner classifier 136, a memory 138, a roll angle determiner 140, and a left/right eye determiner 142.

The Input/output (I/O) unit 132 can be connected to a network, database, and/or image acquisition device 120. An image received at the I/O unit 132 may be sent to the pre-processor 134 to determine if the received image includes an eye image and to pre-process the image. In some implementations, the (I/O) unit 132 may include a transceiver, a display, and one or more sensors.

The transceiver may include a transmitter and a receiver and may be utilized to communicate with other devices, including, for example, the IAD 120. The transceiver may include amplifiers, modulators, demodulators, antennas, and various other components. The transceiver may communicate with the IAD 120 to obtain an image or, in some cases, to provide an image from memory 138. The transceiver may direct data received from the IAD 120 to other components of the computing device 130 such as the pre-processor 134 and memory 138.

The display may display various data to a user. For example, the display may be configured to display an image received from the IAD 120, a processed image, and various graphical user interfaces for performing operations on the computing device 130 and to display various information to a user. The display may be implemented using one or more suitable display types including, for example, a projection display, a liquid crystal display (LCD), or light emitting diode (LED) display.

The one or more sensors may include one or more of an optical sensor, capacitive sensor, charge-coupled device sensor, gyroscope, microphone, altimeter, impact sensor, piezoelectric sensor, motion sensor, biosensor, active pixel sensor, a tactile unit, and various other sensors that may detect one or more conditions or receive input from the user. In some implementations, a keyboard for receiving alphanumeric text from the user may be implemented using the one or more sensors.

Pre-processing operations performed by the pre-processor 134 may include adjusting the image according to one or more adjustments. For example, an image may be resampled to center an iris of the detected eye. A predefined, fixed iris radius may help reduce variation between samples and improve operational performance. The resampling may involve a down sampling factor which may reduce computational complexity and introduce some smoothing of the image data. Additional aggressive smoothing, scaling, rotating, lighting correction, or contrast enhancement may be performed as part of the pre-processing.

Eye corner classifiers 136 may include neural network classifiers as described in further detail below. In general, the eye corner classifiers 136 are configured to determine one or more of an inner eye corner and an outer eye corner for a left eye and/or a right eye. Although the eye corner classifiers 136 described herein include neural network classifiers, various suitable classifiers may be utilized for processing and classifying eye images.

Memory 138 may include one or more mass storage devices, e.g., magnetic, magneto optical disks, optical disks, EPROM, EEPROM, flash memory devices, and may be implemented as internal hard disks, removable disks, magneto optical disks, CD ROM, or DVD-ROM disks for storing data. The memory 138 may store data associated with the processing of an image or metadata associated with an image.

Left/Right eye determiner 142 may be implemented in one or more of digital electronic circuitry, software, firmware, or hardware, or any combinations thereof. The left/right eye determiner 142 may determine a horizontal displacement between the center of the iris and the center of the pupil in an eye image. Based on the determined horizontal displacement, the left/right eye determiner 142 may predict whether the eye image includes an image of a left eye or a right eye. In some implementations, the left/right eye determiner 142 may supplement the determined horizontal displacement data with data from the eye corner classifiers 138 that indicate a location of the eye corners in the eye image. As explained in further detail below, the combined horizontal displacement data and eye corner location data may provide a more accurate prediction of whether an eye image includes a left eye image or a right eye image.

Roll angle determiner 140 may be implemented in one or more of digital electronic circuitry, software, firmware, or hardware, or any combinations thereof. The roll angle determiner 140 may determine a roll angle or orientation indicator in an eye image. The roll angle determiner 140 may communicate with the eye corner classifiers 136 to obtain data indicative of the location of one or more eye corners in an eye image. The roll angle determiner 140 may also perform iris normalization and unwrapping, which includes transforming an eye image from Cartesian coordinates to polar coordinates. A polar image is generated as a result of the transformation and provides a rectangular entity for subsequent image processing and roll angle determination. The roll angle determiner 140 may determine shifts in the locations of the inner eye corner and the outer eye corner from the polar eye image. The shifts correspond to a roll angle or orientation indicator of the eye image. The roll angle or orientation indicator may be stored in memory 138 as a feature of a biometric sample of an individual, and may be used in matching eye images from multiple source.

Figure 2:
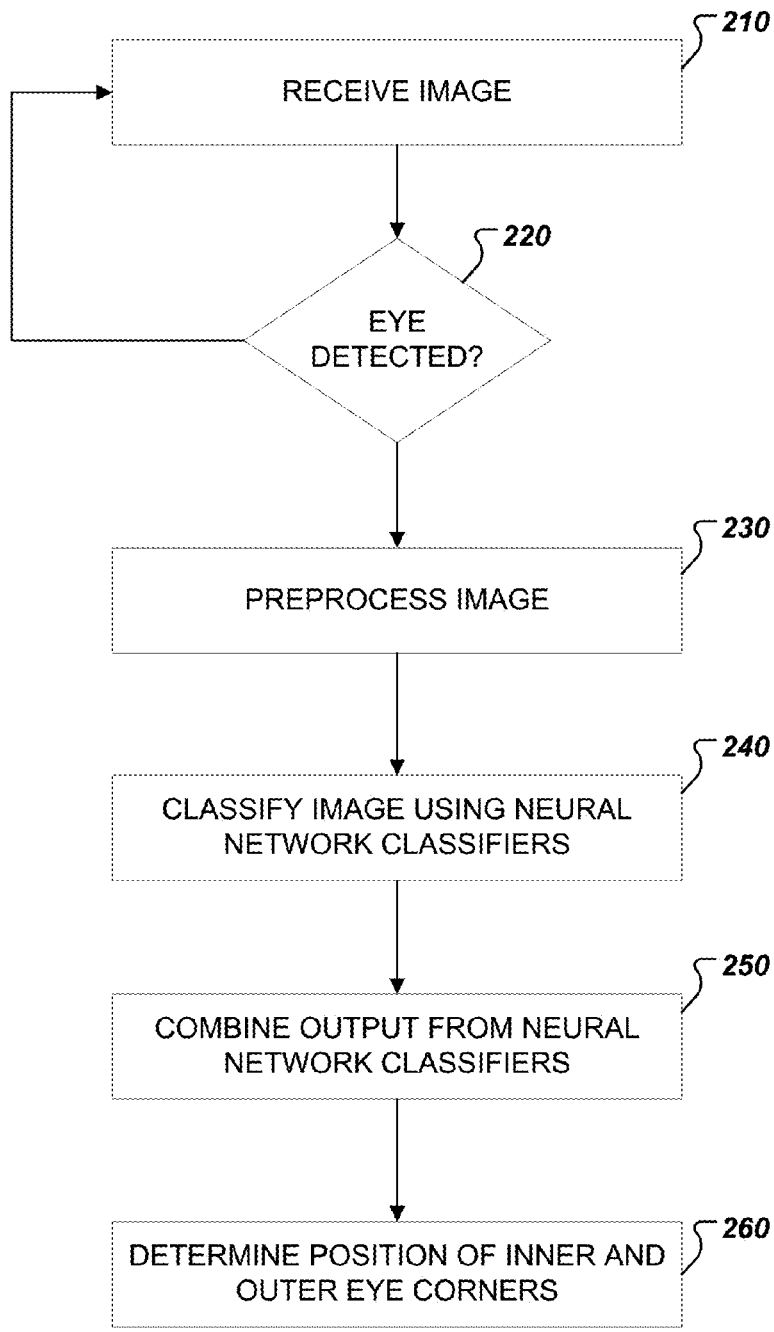
FIG. 2 depicts a flowchart illustrating a method for inner and outer eye corner detection.

Referring to FIG. 2, an image is received by the computing device 130 (210). In some implementations, the image may be a digital image received from IAD 120. In some implementations, the received image may be converted to a digital format for computerized processing. The received image may be scanned to determine whether an eye is present in the image (220). In general, various suitable facial and eye detection tools, including, for example, libraries and codes on edge detection, segmentation, may be used to detect an eye in an image. If no eye is detected, the received image is not processed any further and the computing device 130 may wait to receive another image of an eye.

The received image may be of any suitable size. In some implementations, the received eye image may be 40 pixels by 40 pixels or 100 pixels by 100 pixels, and may include periocular information.

If an eye is detected in the received image, the image may be preprocessed (230). Preprocessing involves adjusting the image according to one or more adjustments. For example, one or more of edge detection, resampling, segmentation, and localization may be performed as part of the preprocessing of an image. In some cases, the image may be preprocessed to remove eyelid and eyelash occlusions. In some cases, the image may be resampled to center an iris of the detected eye. A predefined fixed iris radius may help reduce variation between samples and improve operational performance. The resampling may involve a down sampling factor which may reduce computational complexity and introduce some smoothing of the image data. Additional aggressive smoothing, scaling, rotating, lighting correction, or contrast enhancement may be performed.

As part of the preprocessing, the image may be segmented into a plurality of regions of interest (ROIs). Segmentation and preprocessing of the image may provide data indicative of one or more boundaries of the iris. For example, a region of the iris may be approximated by one or more circular regions. One circular region may correspond to the iris/sclera boundary, and another circular region may correspond to the iris/pupil boundary.

In some implementations, to reduce the amount of computation to processing eye images, preprocessing of eye images may include selection of one or more regions of interest so that portions of the eye image that may not be necessary to process are not processed. In addition, in some implementations, edge detection may be performed as part of the preprocessing to enhance a reliability of subsequent eye corner classification by the eye corner classifiers 136.

After an eye image is preprocessed, the eye image may be further processed and classified using at least two neural network classifiers (240). The at least two neural network classifiers may include a first classifier configured to classify inner (nasal) corners of an eye image and a second classifier configured to classify outer corners of an eye image.

Various machine learning algorithms and neural networks may be utilized to train and operate the at least two classifiers to classify inner corners and outer corners of an eye image. The at least two classifiers may be connected to the Input/Output unit 132, which may receive a training set of eye images for training purposes from one or more of a network, module, and database. The training set may include positive samples with labeled eye corners and negative samples with no eye corners. In some implementations, the at least two classifiers may be trained to provide eye corner pixel location information (e.g., X, Y coordinate or polar coordinate information) or eye corner distance data, as well as an indication of whether the image includes one or more eye corners.

Hereinafter, various types of neural network classifiers are described. One or more of these types of neural network classifiers may be used as the at least two neural network classifiers. Each neural network classifier may accept a ROI of the eye image as an input, and may provide at least one distance measure describing the displacement of the ROI from the eye corner location in the eye image. In some implementations, each neural network classifier may process multiple ROIs of an eye image.

In some implementations, a neural network classifier can be trained to receive an eye image as input, and provide, as an output, an empty image (e.g., all black=0 pixels) with a single identifying pixel (e.g., white=255) to indicate a manual markup of a single eye corner location. Separate networks are trained for left inner, left outer, right inner and right outer eye corners. Use of this trained neural network for corner detection is achieved by input of an eye image and evaluation of the output activation values to detect a peak at the detected corner.

In some implementations, a neural network classifier can be trained to receive an eye image as input, and provide, as an output, an empty image (e.g., all gray=127 pixels) with two identifying pixels (e.g., one at black=0 for inner corner and one at white=255 for outer corner) to indicate a manual markup of both inner and outer eye corner locations on training samples. Separate networks are trained for left eyes and right eyes. Use of the trained neural networks for corner detection is achieved by input of an eye image and evaluation of the output activation values to detect a peak and a trough at the detected corner locations.

In some implementations, a neural network classifier can be trained to receive an eye image as input, and provide, as an output, eye corner location coordinates for a single corner. Separate networks are trained for left inner, left outer, right inner and right outer eye corners. Use of the trained neural networks for corner detection is achieved by input of an eye image and evaluation of the output activation values to identify the coordinates of the detected corner.

In some implementations, a neural network classifier can be trained to receive an eye image as input, and provide, as an output, eye corner location coordinates for inner and outer corners. Separate networks are trained for left and right eyes. Use of the trained neural networks for corner detection is achieved by input of an eye image and evaluation of the output activation values to identify the coordinates of the detected corner.

In some implementations, a neural network classifier can be trained to receive a patch (e.g., 16 pixels×16 pixels region of interest) from an eye image as input, and provide, as an output, distance values indicating how far from a corner location the patch is centered. For example, a patch centered on an eye corner may return a distance of zero. A patch located very far away from a corner returns a large value, representing a physical distance, pixel distance, or pixel coordinate values (e.g., X-coordinate, Y-coordinate). Separate networks are trained for left inner, left outer, right inner, and right outer corners. Use of trained neural networks for corner detection is achieved by (i) submitting multiple patches from an input sample to this configuration of neural network classifier, and (ii) constructing a map from the distance values that result. Because lower values indicate lower distances, a trough in the output map may indicate a location of the eye corner. Smoothing of the map before trough detection may enhance reliability.

In some implementations, a neural network can be trained to receive one or more patches from an eye image as input, and provide, as an output, displacement offsets to the eye corner location. For example, an input patch centered on an eye corner may result in an output displacement of, for example, DX=0, DY=0 if Cartesian coordinates are used, though any suitable coordinate system may be used. An input patch taken from slightly left of a target corner (e.g., inner eye corner) might output a displacement of DX=5, DY=0 if using Cartesian coordinates. Separate networks are trained for left inner, left outer, right inner, and right outer corners. Use of the trained neural networks for corner detection is achieved by (i) submitting one or more patches of an eye image, and (ii) counting the output displacement value as a vote for the corner location. Tracking of vote(s) in an accumulator map would produce a peak at the detected corner location. Smoothing of the map before peak detection may enhance reliability.

Sample outputs of the described neural network classifiers are shown in FIGS. 3-6.

Figure 3:
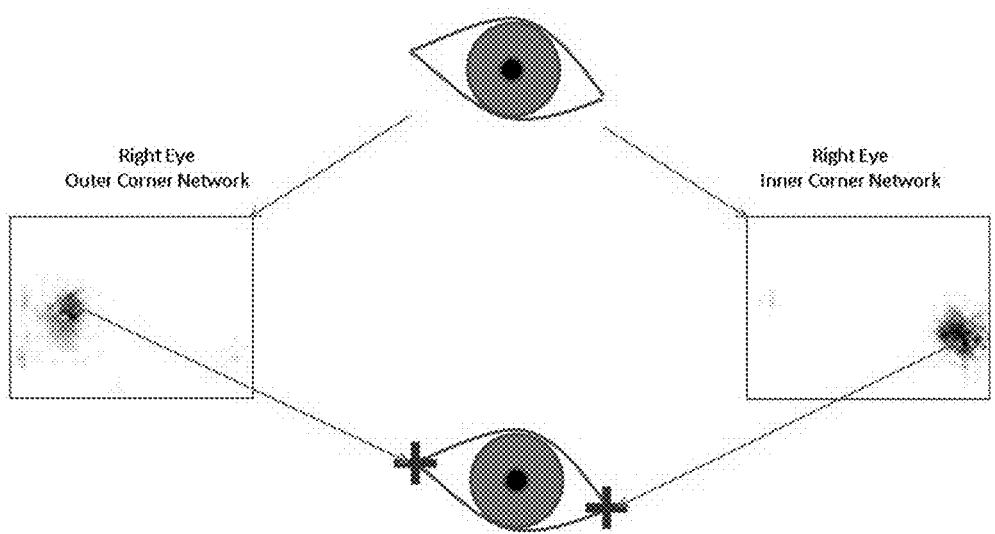
FIG. 3 depicts an exemplary output of a neural network classifier.

As shown in FIG. 3, in some implementations using one or more instances of the above-described neural network classifiers, a right outer corner mask and a right inner corner mask may be used by a block-based distance neural network classifier to determine a right eye outer corner and a right eye inner corner. The black-colored pixels shown in FIG. 3 indicate the likely location of an eye corner. In some implementations, a corresponding block-based distance neural network classifier may be used to determine a left eye outer corner and a left eye inner corner.

Figure 4:
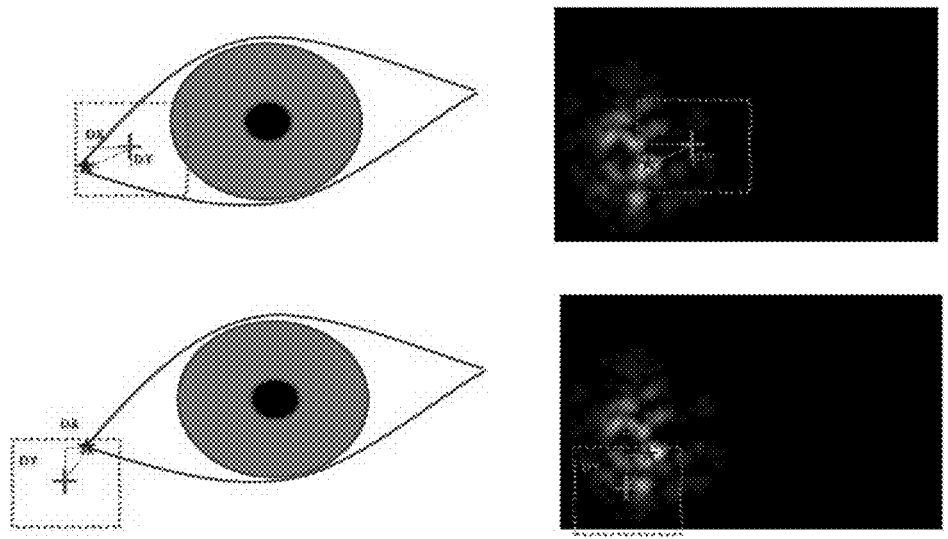
FIG. 4 depicts an exemplary output of a neural network classifier.

As shown in FIG. 4, in some implementations using one or more instances of the above-described neural network classifiers, eye images may be classified by leveraging a block-based displacement network with voting. The implementations may also use expected corner location model masking. As shown in FIG. 4, one or more blocks may be generated that include white-colored pixels indicating voting outcomes for a corner location in left-inner corner network.

Figure 5:
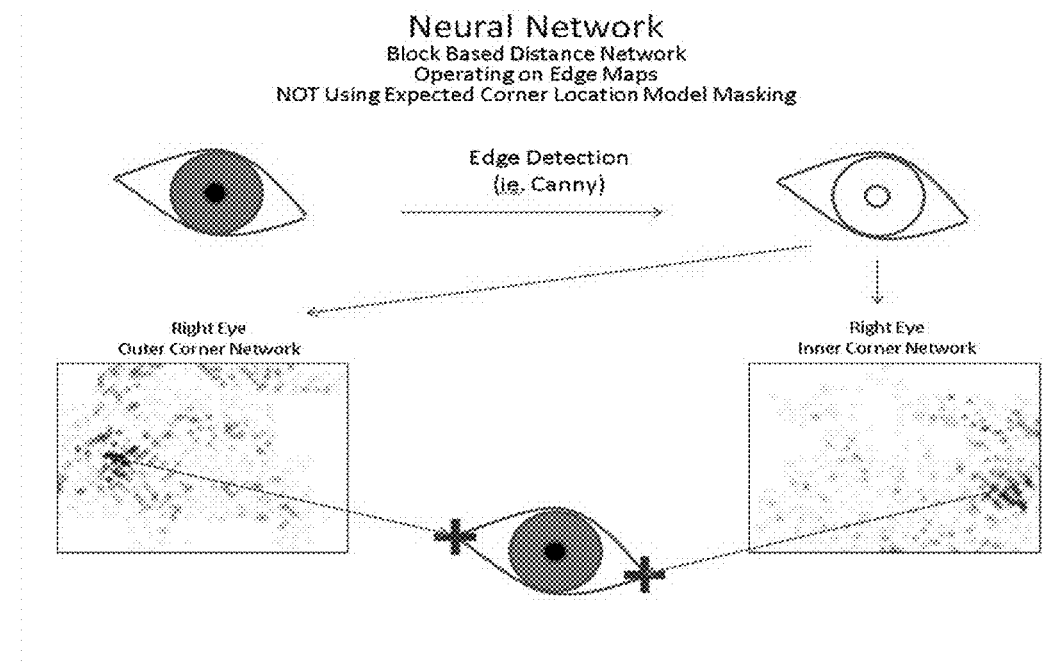
FIG. 5 depicts an exemplary output of a neural network classifier.

As shown in FIG. 5, in some implementations using one or more instances of the above-described neural network classifiers, eye images may be classified by leveraging a blocked-based distance network that operates on edge maps without using expected corner location model masking. Various suitable edge detection techniques may be used to detect expected eye corner locations. The black-colored pixels shown in FIG. 5 indicate the likely location of an eye corner.

Figure 6:
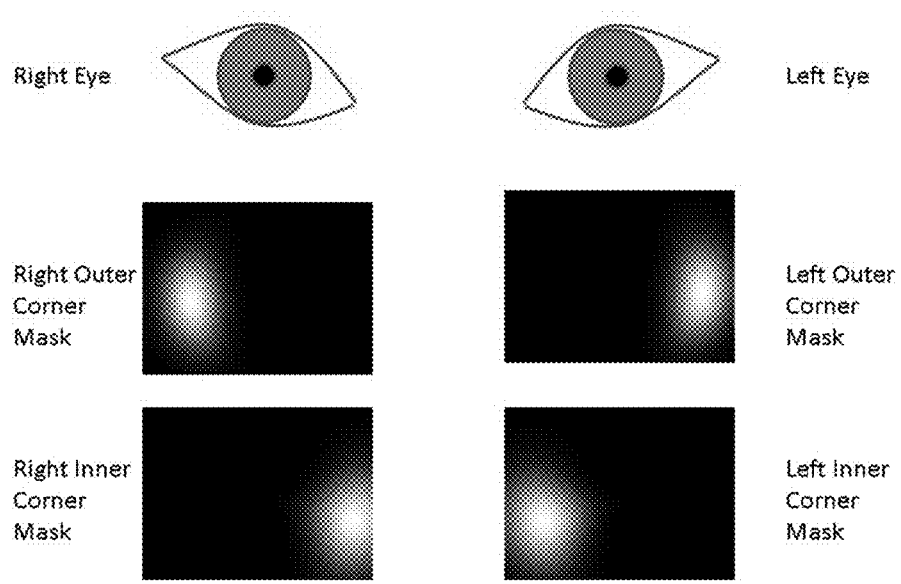
FIG. 6 depicts an exemplary output of a neural network classifier.

As shown in FIG. 6, in some implementations using one or more instances of the above-described neural network classifiers, eye images may be classified by leveraging a blocked-based distance network that uses expected corner location model masking. As shown in FIG. 6, white-colored pixels may indicate voting outcomes for the corner locations of a right eye and a left eye.

After the neural network classifiers classify the eye image, an output classifier may combine the output from all the neural network classifiers (250). Output of the neural network classifiers may be combined with no particular order or preference. In some implementations, the output from all the eye corner classifiers 136 may be combined by averaging the relative displacements of the detected inner eye corner and the relative displacements of the detected outer eye corner determined by the neural network classifiers. The combined output may then be utilized to determine a position of the inner and outer eye corners consistent with the determined displacements of the eye corners and geometry of the eye in the eye image (260). In general, data from the various neural network classifiers can be aggregated, averaged, and/or used in various suitable ways. Combining the output from multiple neural network classifiers may help reduce errors due to noise and improve the accuracy of eye corner detection in an eye image.

In some implementations, a voting may occur after the output from all the neural network classifiers is combined to determine inner or outer eye corners. Voting may be performed based on one or more criteria or rules for identifying one or more of a left inner eye corner, a left outer eye corner, a right inner eye corner, and a right outer eye corner. In some implementations, a threshold may be used to determine whether the cumulative data from the various neural network classifiers indicates the presence of an eye corner. For instance, if a relative displacement of a detected eye corner is less than (e.g., does not satisfy) a threshold, the eye corner classifiers 136 may vote that the detected eye corner is not a true eye corner. If the relative displacement of the detected eye corner is greater than or equal to (e.g., satisfies) a threshold, the eye corner classifiers 136 may vote that the detected eye corner is a true eye corner.

After the positions of the inner and outer eye corners are determined using the combined output from the neural network classifiers, the positions of the inner and outer eye corners may be stored and used as the registered eye corner positions for the eye image. The registered eye corner information may provide periocular data that can be useful for subsequent eye image processing. For example, as explained below, the registered eye corner information may be used to determine whether an eye image includes a left eye or right eye, an orientation or rotation of iris, and various other information about an eye.

As can be appreciated from the foregoing, because the implementations described above utilize a variety of different neural network classifiers that are trained using different methods and the output from the various neural network classifiers are combined, the final determined position of an inner or outer eye corner is highly reliable and accurate, and may be consistent across various determination methods.

Hereinafter, a method for determine whether an eye image is an image of a left eye or a right eye is described.

Figure 7:
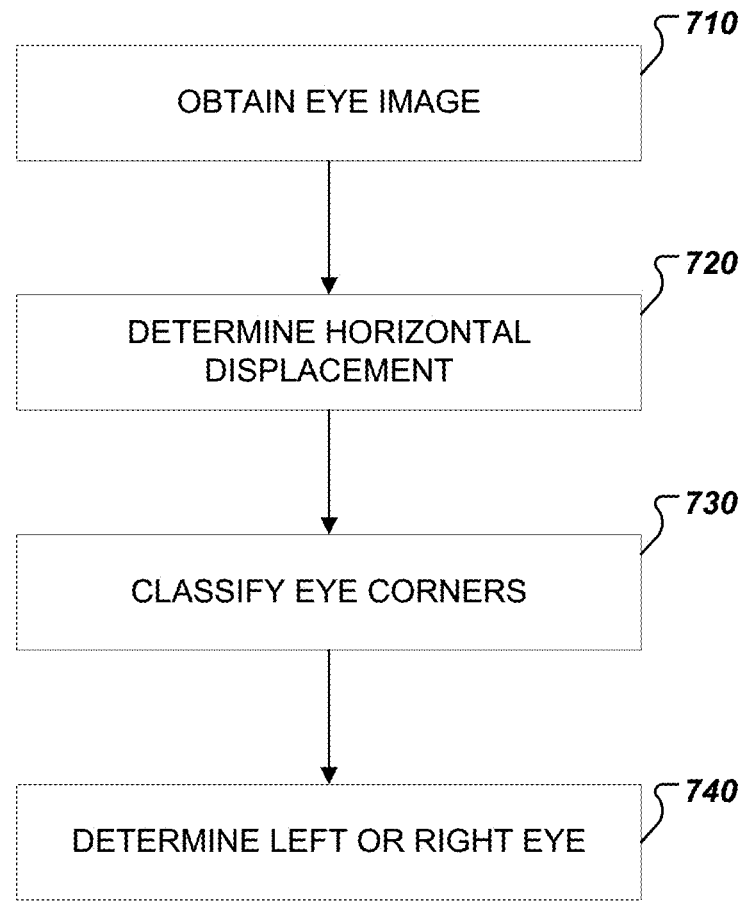
FIG. 7 depicts a flowchart illustrating a method for differentiating left and right eye images using eye corners and iris/pupil offset.

Referring to FIG. 7, an image of an eye is obtained through various suitable methods as described above (710). For example, the eye image may be obtained using the IAD 120 or may be retrieved from a database or network. As another example, a radiation signal (e.g., IR signal) may be emitted by the illumination source in IAD 120 towards the subject (e.g., an eye). The radiation signal may reflect from the subject and be detected by IAD 120, which thereby obtains an image of the subject's eye. The image of the subject may include an image of a pupil and an iris in the subject's eye.

In some implementations, the image may be a digital image received from IAD 120. In some implementations, the received image may be converted to a digital format for computerized processing. In some implementations, the received image may be scanned.

After obtaining the eye image, a center location of the iris and a center location of the pupil in the eye image are detected. The center locations of the iris and pupil may be detected using various suitable tools and computer algorithms. As an example, the outer contours of the iris and pupil may be identified and a center of mass of the contoured iris and pupil, respectively, may provide the center location of the iris and the center location of the pupil, respectively.

A horizontal displacement between the center of the iris and the center of the pupil is then determined (720). The horizontal displacement may include a directional component as well as a magnitude of the displacement between the center of the iris and the center of the pupil. For example, the horizontal displacement may include data indicating how many pixels apart the center of the iris is from the center of the pupil, or in some cases, a physical distance separating the centers of the iris and pupil, and data indicating a direction that the center of the iris is located relative to the center of the pupil.

Figure 8:
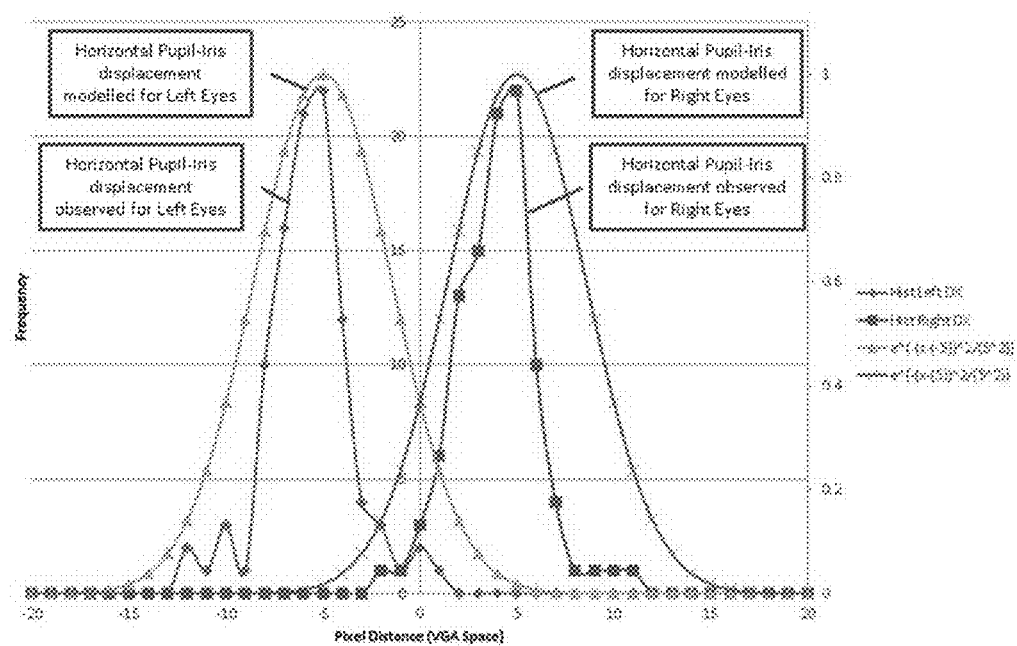
FIG. 8 depicts a graph of observed and modelled horizontal displacement for left and right eyes.

The determined horizontal displacement may provide a prediction as to whether the imaged eye is a left eye or right eye. Referring to FIG. 8, the determined horizontal displacement may be distributed over a range of values. If the determined or observed horizontal displacement corresponds to an expectation value of the pupil-iris horizontal displacement, a prediction of whether the imaged eye is a left eye or right eye may be made. As illustrated, the expectation value can be positive or negative, indicating the expected direction of displacement.

For example, if the determined horizontal displacement is similar to the curve illustrated in the positive pixel distance space with a large pupil-iris horizontal displacement, the subject's imaged eye may be predicted to be a right eye. If the determined horizontal displacement is similar to the curve illustrated in the negative pixel distance space with a large pupil-iris horizontal displacement, the subject's imaged eye may be predicted to be a left eye.

To improve the reliability and accuracy of the prediction, eye corners in the eye image may be classified using the eye corner classifiers 136 as described above with respect to FIGS. 2-6 (730). For example, a first neural network classifier may be used to classify inner corners of an eye image and a second neural network classifier may be used to classify outer corners of the subject's eye image.

The additional data provided by the eye corner classifiers 136 may be combined with the determined horizontal displacement to more precisely determine whether the eye image includes an image of a left eye or a right eye (740). In particular, because information indicating a location, shape, or profile of the inner and outer corners of an eye may provide more information and accuracy regarding an imaged eye, combining the additional data with the determined horizontal displacements provides greater accuracy for determining whether an imaged eye is a left eye or a right eye.

As an example, if the eye image prediction (e.g., right eye image) from the data corresponding to the horizontal displacement matches the eye image prediction (e.g., right eye image) from the data corresponding to the eye corner classification, the let/right eye determiner 142 may generate a prediction consistent with the eye image prediction from the data corresponding to the horizontal displacement and eye corner classification. However, if the eye image prediction (e.g., right eye image) from the data corresponding to the horizontal displacement does not match the eye image prediction (e.g., left eye image) from the data corresponding to the eye corner classification, the let/right eye determiner 142 may not provide a prediction for the eye type and instead send a request to the IAD 120 to retake an eye image.

The combination of the additional data and the determined horizontal displacement may be compared to a confidence threshold for a left eye and a confidence threshold for a right eye. If the combination satisfies the confidence threshold (e.g., greater than or equal to the confidence threshold) for the left eye, the subject's eye image may be determined to correspond to a left eye. If the combination satisfies the confidence threshold for the right eye, the subject's eye image may be determined to correspond to a right eye. If the combination fails to satisfy the confidence threshold for either the right eye or the left eye or satisfies the confidence threshold for both the right eye and the left eye, the subject's eye image may be unclassified, and the computing device 130 may instruct the IAD 120 to obtain another image of the subject so that the subject's eye may be classified again.

According to the implementations described above, an eye image may be classified as a left eye or a right eye using data associated with inner and outer eye corners and a horizontal displacement of an iris and pupil. This classification method may yield a higher accuracy than most conventional techniques for classifying left or right eyes.

Determining whether an eye image includes a left eye image or a right eye image provides several advantages. For example, in laser eye surgery applications or instances where only a single iris is imaged, labeling an eye image as a right eye image or a left eye image may avoid potential confusion due to a mismatch of eyes. The method disclosed herein also avoids the computational burden of comparing an eye image with numerous images in a database to identify whether an image of a particular person is a left eye image or a right eye image. Thus, the disclosed method provides a simpler and more accurate method of determining a left or right eye image.

Hereinafter, a method for determining a roll angle of an eye in an eye image is described with reference to FIGS. 9-16.

Figure 9:
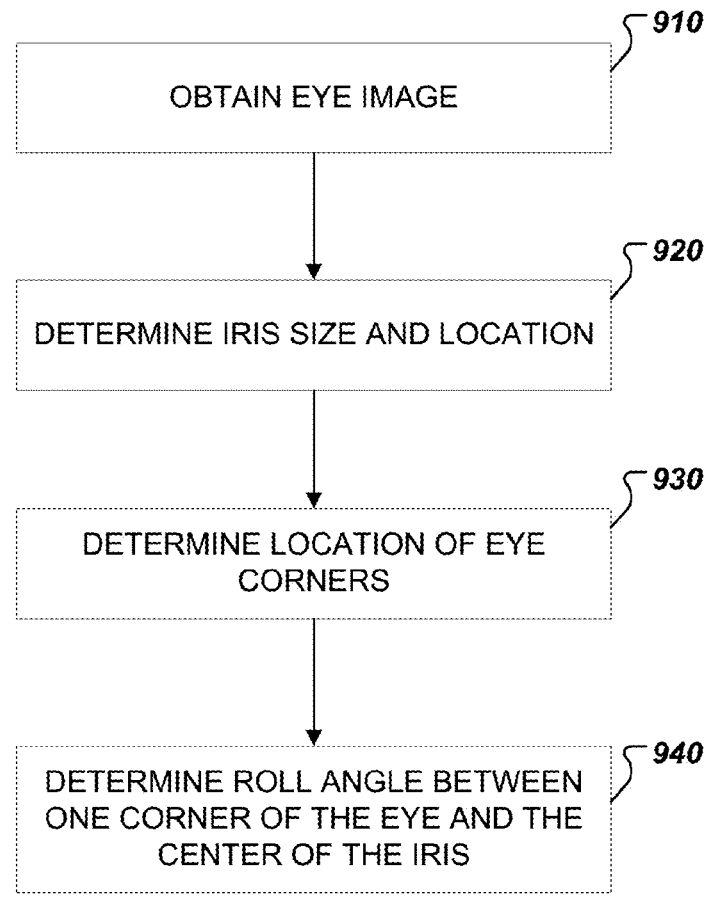
FIG. 9 depicts a flowchart illustrating a method for determining a roll angle of an eye.
Figure 10:
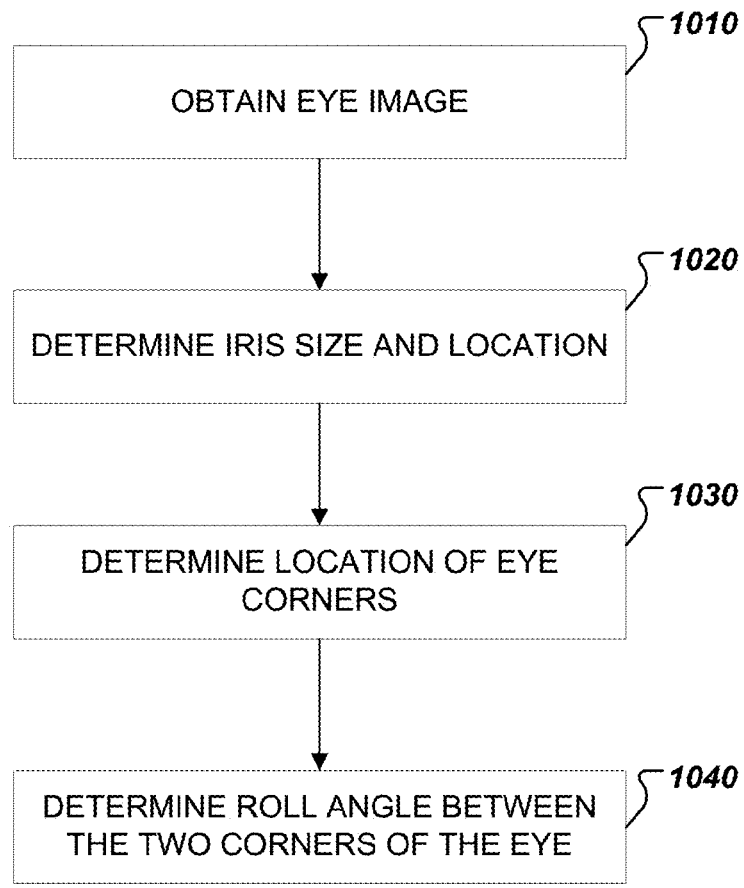
FIG. 10 depicts a flowchart illustrating a method for determining a roll angle of an eye.

Referring to FIGS. 9 and 10, an image of an eye is obtained through various suitable methods as described above (910) (1010). For example, the eye image may be obtained using the IAD 120 or may be retrieved from a database or network. As another example, a radiation signal (e.g., IR signal) may be emitted by the illumination source in IAD 120 towards the subject (e.g., an eye). The radiation signal may reflect from the subject and be detected by IAD 120, which thereby obtains an image of the subject's eye. The image of the subject may include an image of a pupil and an iris in the subject's eye.

In some implementations, the image may be a digital image received from IAD 120. In some implementations, the received image may be converted to a digital format for computerized processing. In some implementations, the received image may be scanned.

Figure 11:
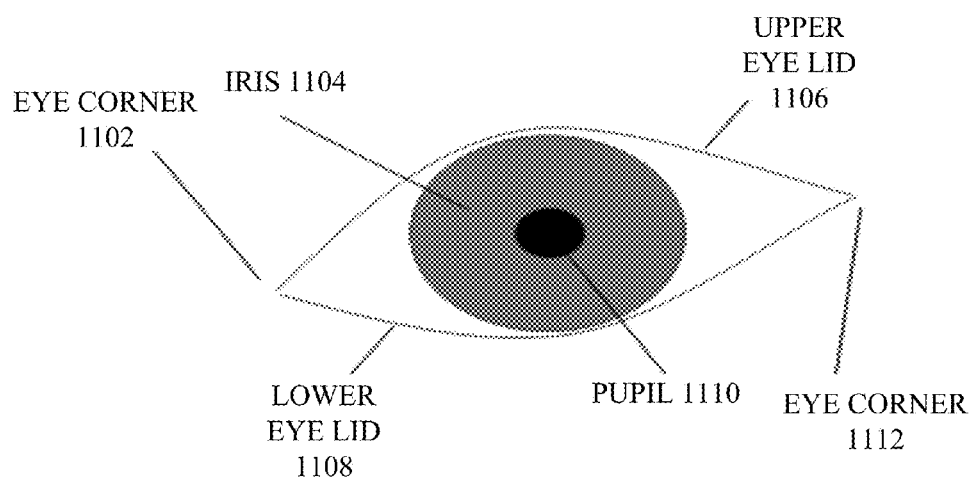
FIG. 11 depicts a view of various anatomical structures of an eye.

After obtaining the eye image, the eye image may be preprocessed. As described above, preprocessing an eye image may include one or more of edge detection, resampling, segmentation, and localization. For example, an eye image may be segmented, and an eye image encompassing an eye lid may be extracted. As illustrated in FIG. 11, eye-lids 1106 and 1108 correspond to the upper and lower eye lids in an image from the video feed. Eye-lids 1106 and 1108 intersect at corners 1102 and 1112. Inside the region encompassed by eye-lids 1106 and 1108, iris 1104 corresponds to a donut shape that surrounds pupil 1110.

Figure 12:
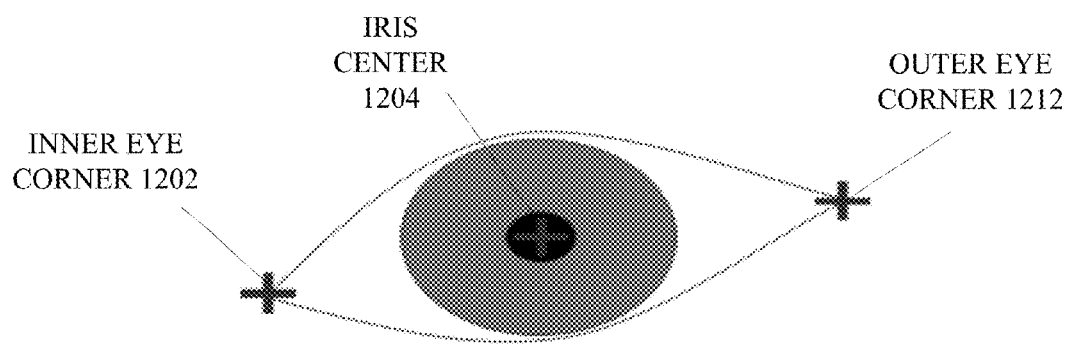
FIG. 12 depicts an eye image with located eye corners and iris center.

Next, a size and location of the iris 1104 and/or iris center 1204 may be determined (920) (1020). As shown in FIG. 12, the center location 1204 of the iris 1104 may be detected using various suitable tools and computer algorithms. As an example, referring to FIG. 12, the outer contours of the iris 1104 and pupil 1110 may be identified, and a center of mass of the contoured iris 1104 and pupil 1110, respectively, may provide the center location 1204 of the iris 1104 and pupil 1110. In some instances, the size of iris 104 or pupil 102 may be estimated directly from fitting the contours of the iris 104 or pupil 102 in the image. In other instances, the size of iris 1104 or pupil 1110 is cast to be similar to a template size, for example, set forth by a video input component.

Using the detected center 1204 and size of the iris 1104, the area of the image where eye corners 1202 and 1212 are likely to be found relative to the iris center 1204 are determined (930) (1030). In some implementations, corners 1202 and 1212 may be determined using eye corner classifiers 136 as described above.

In some implementations, corners 1202 and 1212 may be detected as the intersecting points of eye lids 1106 and 1108 using for example, edge-sensitive transformations. Example edge-sensitive transformations may include Hough transform, wavelet transform, or Gabor transform. Some implementations may incorporate a template matching component to identify corner regions with shapes most similar to template corner shapes. The templates may be from a database of corner shapes as successfully segmented by, for example, expert operators. The database of templates may be updated to reflect knowledge of corner shapes learned from the current template matching experience.

In some cases, the corners 1102 and 1112 may be determined in polar coordinates with the iris center 1204 of the eye as the origin. In some cases, the corners 1102 and 1112 may be determined in Cartesian coordinates.

Some implementations include providing feedback on a confidence level associated with the detected corners 1102 and 1112, for example, based on the quality of template matching. In some instances, corner detection confidence level is dependent on the agreement between each corner 1202, 1212 and the iris center 1204.

Figure 13:
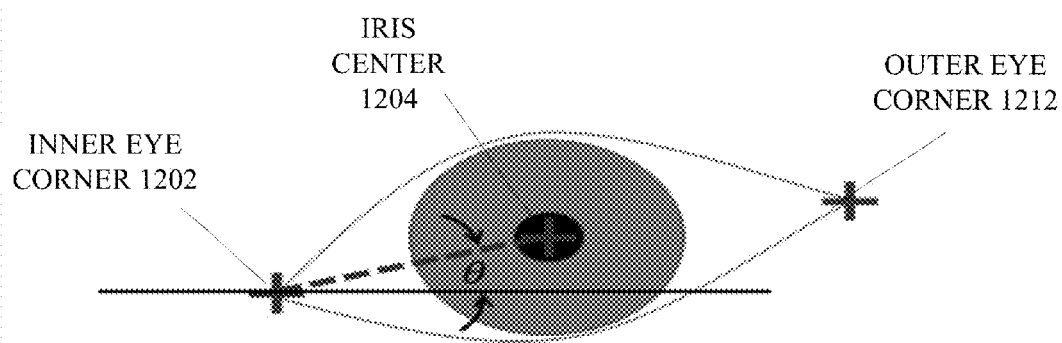
FIGS. 13 and 14 depict two methods of determining a roll angle.
Figure 14:
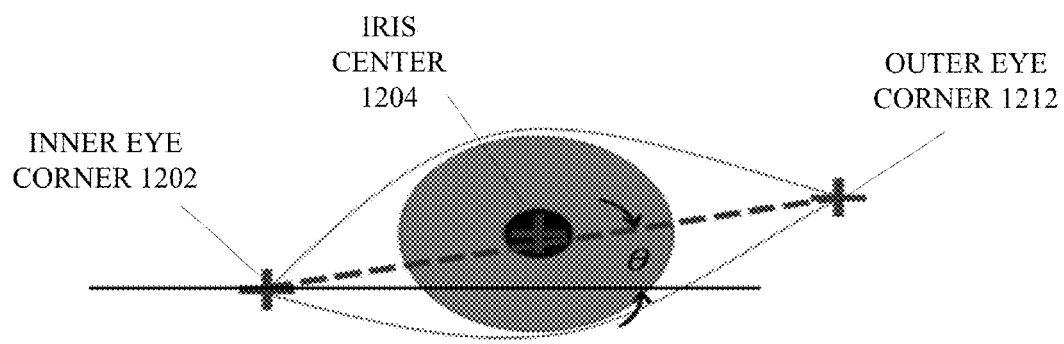

Based on the determined iris 1104 size, iris center 1204, location of the eye corners 1202 and 1212, a roll angle associated with the eye image may be determined. In some implementations, the roll angle between one corner of the eye and the iris center 1204 may be determined (940), as illustrated in FIG. 13. In some implementations, the roll angle between the two corners of the eye (i.e., inner eye corner 1202 and outer eye corner 1212) may be determined (1040), as illustrated in FIG. 14. As can be seen in FIG. 13, in some implementations, the roll angle may be an angle between a horizontal line extending from an eye corner (e.g., 1202, 1212), and a line extending from the eye corner (e.g., 1202, 1212) and an iris center 1204. As can be seen in FIG. 14, in some implementations, the roll angle may be an angle between a horizontal line extending from an eye corner (e.g., 1202, 1212), and a line extending from the inner eye corner 1202 to the outer eye corner 1212.

The determined roll angle may be stored in memory 130. In some implementations, the determined roll angle may be used as an orientation indicator that indicates an orientation of an eye image, or an indicator of an offset of an eye image. For example, when multiple eye images are being compared, respective roll angles of the eye images may be used to align the images to a common orientation or alignment. The use of roll angles may save computational resources by avoiding the extensive use of template matching and/or image processing/correction to match or align eye images.

Figure 15:
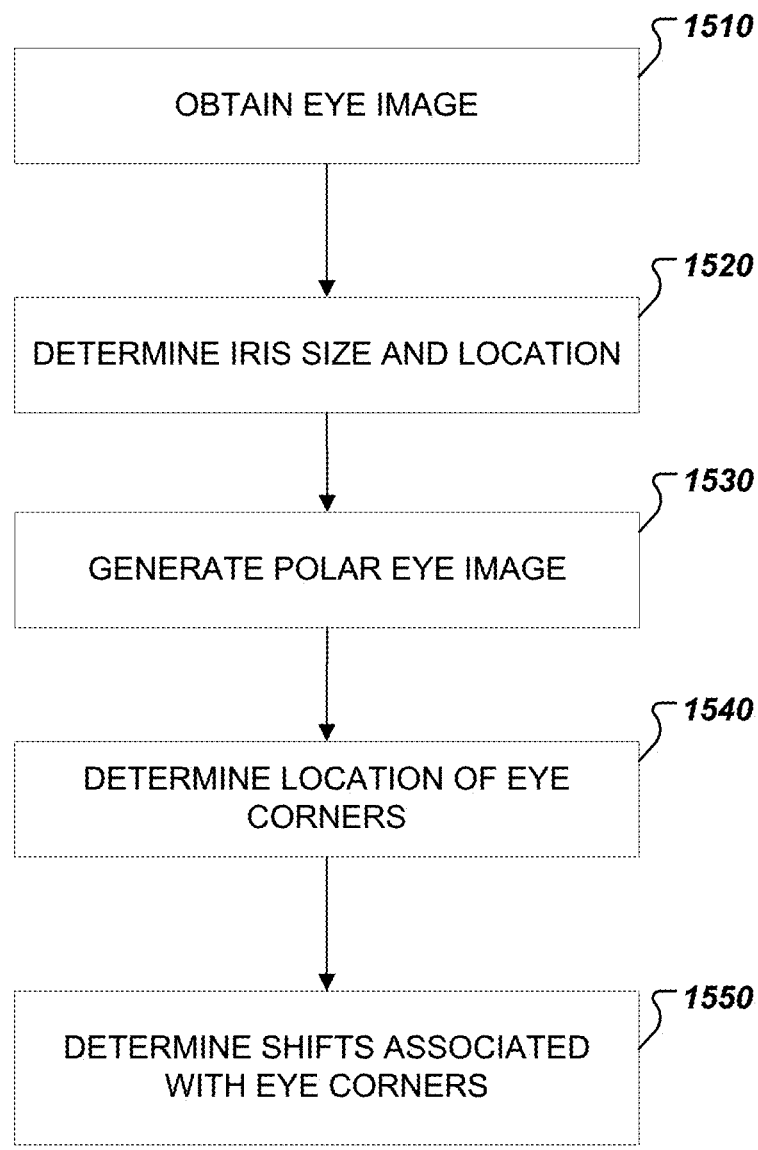
FIG. 15 depicts a flowchart illustrating a method for determining a roll angle of an eye using a polar image.
Figure 16:
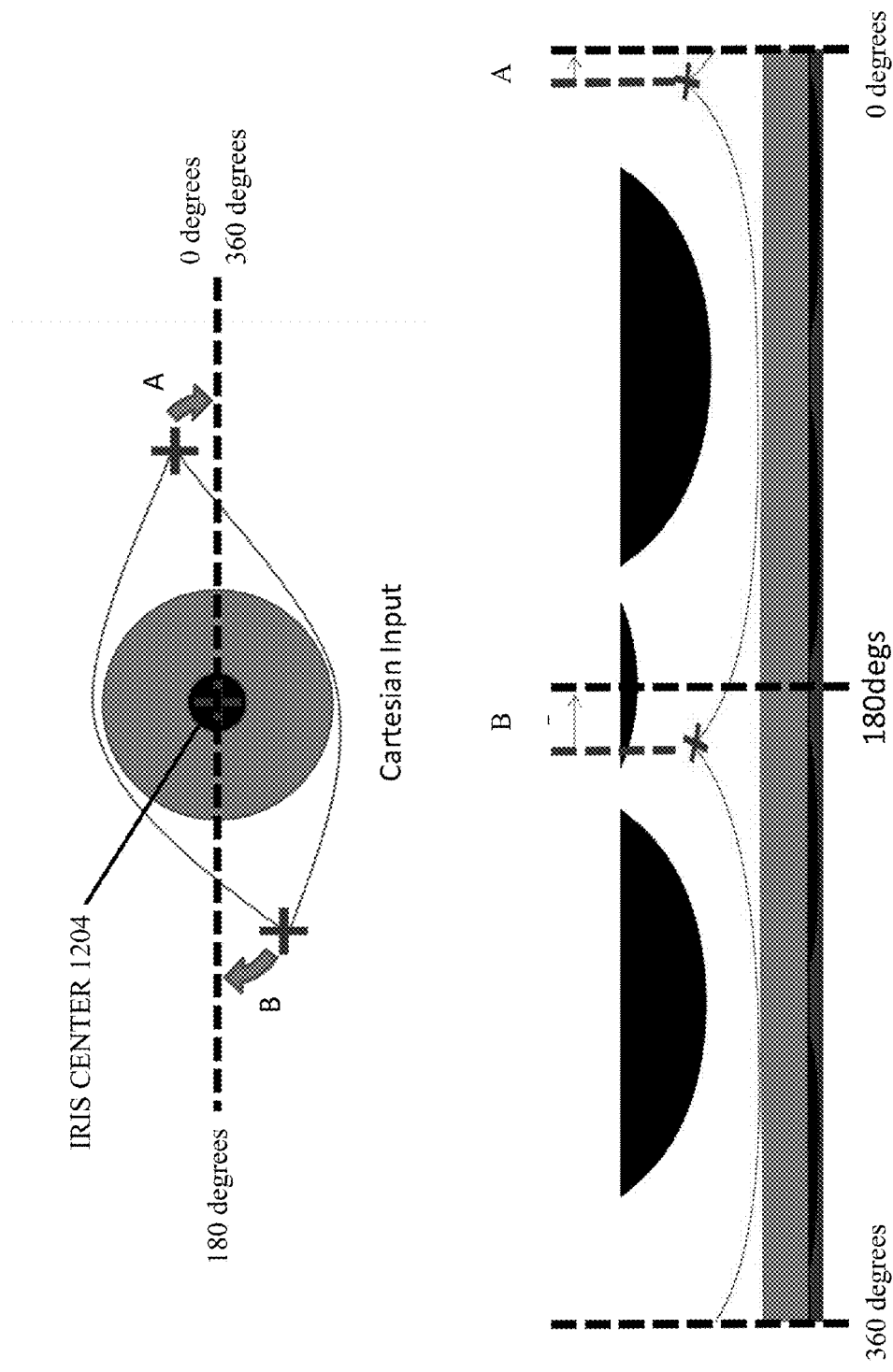
FIG. 16 depicts a conversion of an eye image from Cartesian coordinates to a polar coordinates-based image.

FIGS. 15 and 16 illustrate implementations of determining a roll angle or orientation indicator in an eye image using polar eye images. Steps 1510 and 1520 are similar to steps 910 and 920, and a repeated description is not provided herein.

After determining a size and location of the iris 1104 and iris center 1204, the obtained eye image may be normalized and unwrapped to generate a polar eye image (1530). In some implementations, the obtained eye image may be unwrapped in a clockwise direction. In some implementations, the obtained eye image may be unwrapped in a counter-clockwise direction. Unwrapping of the obtained eye image may be performed by converting pixel values associated with Cartesian coordinates to pixel values associated with polar coordinates. When the obtained eye image is converted to a pixel eye image, the iris center 1204 may be used as a reference point for performing the conversion.

FIG. 16 illustrates an exemplary implementation of the normalization and unwrapping of an eye image. As shown in FIG. 16, the eye image is converted into a lateral orientation in polar coordinates. The lateral orientation facilitates easier identification of eye corners and comparison of multiple eye images.

Additional advantages of performing normalization, unwrapping of an eye image, and converting to a polar eye image include minimizing computational costs and enhancing accuracy. For example, an area for eye corner detection may be narrowed or restricted to one or more expected rectangular regions of interest in the polar image. In contrast, in Cartesian space, an irregular shaped (e.g., donut shaped) region of interest in Cartesian space may be searched. In addition, eyelid boundaries produce wave-like ripple patterns that are obscured in Cartesian space but appear in polar space, with the eye corners being detectable near the crests. Thus, the polar image may provide more accurate data and information in an eye image.

In some implementations, after the polar eye image is generated, the locations of the eye corners 1202 and 1212 may be determined by eye corner classifiers 136 (1540). In some implementations, the locations of the eye corners 1202 and 1212 may be determined before generating the polar eye image similar to the manner the locations of the eye corners 1202 and 1212 are determined in (930) and (1030) as described above. If the location of the eye corners 1202 and 1212 are determined before generating the polar eye image, the location of the eye corners 1202 and 1212 are translated from Cartesian coordinates to polar coordinates.

Based on the determined location of the inner eye corner 1202 and the determined location of the outer eye corner 1212, a shift associated with the inner eye corner 1202 and a shift associated with the outer eye corner 1212 are determined (1550). In FIG. 16, shift B or angle B is the shift associated with the inner eye corner 1202, and shift A or angle A is the shift associated with the outer eye corner 1212. Shift A may be determined by the difference of the location of the outer eye corner 1212 from the location of a 0° or 360° mark. Shift B may be determined by the difference of the location of the inner eye corner 1202 from the location of a 180° mark. Because the obtained eye image has been normalized and converted to a lateral orientation of a polar eye image, determining the differences in the location of the eye corners 1202 and 1212 and the 0°, 180°, or 360° mark may not be computationally intensive.

The determined shifts may correspond to iris features or roll angles in the obtained eye image. For example, shift A may correspond to a roll angle associated with the outer eye corner 1212. Shift B may correspond to a roll angle associated with the inner eye corner 1202. In some cases, shifts A and B may be rotationally normalized iris features. For example, shifts A and B may have normalized values associated with rotational features of the normalized eye image. Furthermore, irrespective of whether the eye image is in polar or Cartesian space, shifts A and B in the eye image may be rotationally invariant and may be referred to as rotationally invariant iris features.

In some implementations, the methods illustrated in FIGS. 9, 10, and 15 may be combined. For example, roll angles determined according to the methods illustrated in FIGS. 9, 10, and 15 may be combined or averaged in the Cartesian space or Polar space to improve a reliability or accuracy of the roll angle determination.

As described above, the determined roll angles may be stored in memory 130. In some implementations, the determined roll angles may be used as orientation indicators that indicate an orientation of an eye image, or an indicator of one or more offsets of an eye image. For example, when multiple eye images are being compared, respective roll angles of the eye images may be used to align the images to a common orientation or alignment. The use of roll angles may save computational resources by avoiding the extensive use of template matching and/or image processing/correction to match or align eye images. In some cases, the roll angles may be used to determine or compare one or more other iris features in the polar eye image.

Implementations described above may be applied in various manners. For example, in some cases, the implementations described above may be used to identify or track one or more objects or subjects. In some cases, the implementations described above may be used for biometric analysis, identification, and/or validation. For example, the implementations described above may be used to determine whether eye image samples belong to the same person or different people. It can be appreciated that the methods described above may be similarly applied to various other biometric indicators such as finger prints and distinguishing between left and right hands. Results of the biometric analysis, identification, and/or validation may also be compared with existing identity databases, such as a Department of Motor Vehicles (DMV) database, a State Department database, a Federal Bureau of Investigation (FBI) watch list, or most-wanted list, for further verification.

Embodiments and all of the functional operations and/or actions described in this specification may be implemented in digital electronic circuitry, or in computer software, firmware, or hardware, including the structures disclosed in this specification and their structural equivalents, or in combinations of one or more of them. Embodiments may be implemented as one or more computer program products, e.g., one or more modules of computer program instructions encoded on a computer readable medium for execution by, or to control the operation of, data processing apparatus. The computer-readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

Elements of a computer may include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer may not have such devices. Moreover, a computer may be embedded in another device, e.g., a tablet computer, a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on one or more computers having a display device, e.g., a cathode ray tube (CRT), liquid crystal display (LCD), or light emitting diode (LED) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and may even be claimed as such, one or more features from a claimed combination may in some cases be excised from the combination, and the claimed combination may be directed to a sub-combination or variation of a sub-combination.

Similarly, while actions are depicted in the drawings in a particular order, this should not be understood as requiring that such actions be performed in the particular order shown or in sequential order, or that all illustrated actions be performed, to achieve desirable results. Moreover, the separation of various system components in the embodiments described above should not be understood as requiring such separation in all embodiments, and it should be understood that the described program components and systems may generally be integrated together in a single software product or packaged into multiple software products.

Thus, particular implementations have been described. Other implementations are within the scope of the following claims. For example, the actions recited in the claims may be performed in a different order and still achieve desirable results.

What is claimed is:
1. A computer-implemented method comprising:
detecting an eye image in an image;
classifying, using one or more of a plurality of classifiers coupled to a processor, an inner eye corner in the eye image;
determining, using one or more of the plurality of classifiers coupled to the processor, one or more relative displacements of the inner eye corner from an iris in the eye image based on the classification of the inner eye corner;
determining an average displacement of the inner eye corner from the iris in the eye image based on the relative displacements of the inner eye corner provided by the one or more of the plurality of classifiers;
classifying, using one or more of the plurality of classifiers coupled to the processor, an outer eye corner in the eye image;
determining, using one or more of the plurality of classifiers coupled to the processor, one or more relative displacements of the outer eye corner from the iris in the eye image based on the classification of the outer eye corner;
determining an average displacement of the outer eye corner from the iris in the eye image based on the relative displacements of the outer eye corner provided by the one or more of the plurality of classifiers; and identifying, using the processor, a location of the inner eye corner in the image based on the determined average displacement of the inner eye corner and a location of the outer eye corner in the image based on the determined average displacement of the outer eye corner.

2. The computer-implemented method of claim 1, further comprising:

dividing the eye image into a plurality of regions of interest, wherein each of the regions of interest are processed by the one or more of the plurality of classifiers to classify the inner eye corner or the outer eye corner.

3. The computer-implemented method of claim 1, wherein identifying, using the processor, the location of the inner eye corner in the image based on the determined average displacement of the inner eye corner and the location of the outer eye corner in the image based on the determined average displacement of the outer eye corner comprises:

determining whether the average displacement of the inner eye corner from the iris in the eye image satisfies a threshold; and identifying the location of the inner eye corner in the image based on the average displacement of the inner eye corner from the iris in the eye image satisfying the threshold.

4. The computer-implemented method of claim 1, wherein identifying, using the processor, the location of the inner eye corner in the image based on the determined average displacement of the inner eye corner and the location of the outer eye corner in the image based on the determined average displacement of the outer eye corner comprises:

determining whether the average displacement of the outer eye corner from the iris in the eye image satisfies a threshold;

identifying the location of the outer eye corner in the image based on the average displacement of the outer eye corner from the iris in the eye image satisfying the threshold.

5. The computer-implemented method of claim 1, further comprising:

receiving the image from an image acquisition device; and processing the eye image to center the iris of an eye imaged by the eye image.

6. The computer-implemented method of claim 1, wherein the plurality of classifiers comprises a plurality of neural network classifiers, respectively.

7. A non-transitory computer-readable storage medium comprising instructions, which, when executed by one or more computers, cause the one or more computers to perform actions comprising:

detecting an eye image in an image;

classifying, using one or more of a plurality of classifiers, an inner eye corner in the eye image;

determining one or more relative displacements of the inner eye corner from an iris in the eye image based on the classification of the inner eye corner;

determining an average displacement of the inner eye corner from the iris in the eye image based on the relative displacements of the inner eye corner provided by the one or more of the plurality of classifiers;

classifying, using one or more of the plurality of classifiers, an outer eye corner in the eye image;

determining one or more relative displacements of the outer eye corner from the iris in the eye image based on the classification of the outer eye corner;

determining an average displacement of the outer eye corner from the iris in the eye image based on the relative displacements of the outer eye corner provided by the one or more of the plurality of classifiers; and identifying a location of the inner eye corner in the image based on the determined average displacement of the inner eye corner and a location of the outer eye corner in the image based on the determined average displacement of the outer eye corner.

8. The non-transitory computer-readable storage medium of claim 7, wherein the actions further comprise:

dividing the eye image into a plurality of regions of interest, wherein each of the regions of interest are processed by the one or more of the plurality of classifiers to classify the inner eye corner or the outer eye corner.

9. The non-transitory computer-readable storage medium of claim 8, wherein identifying the location of the inner eye corner in the image based on the determined average displacement of the inner eye corner and the location of the outer eye corner in the image based on the determined average displacement of the outer eye corner comprises:

determining whether the average displacement of the inner eye corner from the iris in the eye image satisfies a threshold; and identifying the location of the inner eye corner in the image based on the average displacement of the inner eye corner from the iris in the eye image satisfying the threshold.

10. The non-transitory computer-readable storage medium of claim 8, wherein identifying, using the processor, the location of the inner eye corner in the image based on the determined average displacement of the inner eye corner and the location of the outer eye corner in the image based on the determined average displacement of the outer eye corner comprises:

determining whether the average displacement of the outer eye corner from the iris in the eye image satisfies a threshold; and identifying the location of the outer eye corner in the image based on the average displacement of the outer eye corner from the iris in the eye image satisfying the threshold.

11. The non-transitory computer-readable storage medium of claim 10, wherein the actions further comprise:

receiving the image from an image acquisition device; and processing the eye image to center the iris of an eye imaged by the eye image.

12. The non-transitory computer-readable storage medium of claim 10, wherein the plurality of classifiers comprises a plurality of neural network classifiers, respectively.

13. A system comprising:

one or more computers and one or more storage devices storing instructions that are operable and when executed by one or more computers, cause the one or more computers to perform actions comprising:

detecting an eye image in an image;

classifying, using one or more of a plurality of classifiers, an inner eye corner in the eye image;

determining one or more relative displacements of the inner eye corner from an iris in the eye image based on the classification of the inner eye corner;

determining an average displacement of the inner eye corner from the iris in the eye image based on the relative displacements of the inner eye corner provided by the one or more of the plurality of classifiers;

classifying, using one or more of the plurality of classifiers, an outer eye corner in the eye image;

determining one or more relative displacements of the outer eye corner from the iris in the eye image based on the classification of the outer eye corner;

determining an average displacement of the outer eye corner from the iris in the eye image based on the relative displacements of the outer eye corner provided by the one or more of the plurality of classifiers; and identifying a location of the inner eye corner in the image based on the determined average displacement of the inner eye corner and a location of the outer eye corner in the image based on the determined average displacement of the outer eye corner.

14. The system of claim 13, wherein the actions further comprise: dividing the eye image into a plurality of regions of interest, wherein each of the regions of interest are processed by the one or more of the plurality of classifiers to classify the inner eye corner or the outer eye corner.

15. The system of claim 13, wherein identifying the location of the inner eye corner in the image based on the determined average displacement of the inner eye corner and the location of the outer eye corner in the image based on the determined average displacement of the outer eye corner comprises:

determining whether the average displacement of the inner eye corner from the iris in the eye image satisfies a threshold; and identifying the location of the inner eye corner in the image based on the average displacement of the inner eye corner from the iris in the eye image satisfying the threshold.

16. The system of claim 13, wherein identifying, using the processor, the location of the inner eye corner in the image based on the determined average displacement of the inner eye corner and the location of the outer eye corner in the image based on the determined relative displacements average displacement of the outer eye corner comprises:

determining whether the average displacement of the outer eye corner from the iris in the eye image satisfies a threshold; and identifying the location of the outer eye corner in the image based on the average displacement of the outer eye corner from the iris in the eye image satisfying the threshold.

17. The system of claim 14, wherein:

the plurality of classifiers comprises a plurality of neural network classifiers, respectively; and the actions further comprise:
  receiving the image from an image acquisition device; and
  processing the eye image to center the iris of an eye imaged by the eye image.

18. The computer-implemented method of claim 1, further comprising:

in response to detecting the eye image in the image, performing, by the processor, one or more of:
  downsampling the image;
  removing eyelid and eyelash occlusions from the image
    segmenting the image into a plurality of regions of interest; and
  detecting one or more edges in the image.

19. The non-transitory computer-readable storage medium of claim 7, wherein the actions further comprise:

in response to detecting the eye image in the image, performing, by the processor, one or more of:
  downsampling the image;
  removing eyelid and eyelash occlusions from the image
    segmenting the image into a plurality of regions of interest; and
  detecting one or more edges in the image.

20. The system of claim 13, wherein the actions further comprise:

in response to detecting the eye image in the image, performing, by the processor, one or more of:
  downsampling the image;
  removing eyelid and eyelash occlusions from the image
    segmenting the image into a plurality of regions of interest; and
  detecting one or more edges in the image.

* * * * *

UNITED STATES PATENT AND TRADEMARK OFFICE
CERTIFICATE OF CORRECTION

PATENT NO. : 9,846,807 B1  
APPLICATION NO. : 14/986427  
DATED : December 19, 2017  
INVENTOR(S) : Joseph Mayer and Brian K. Martin Page 1 of 1

It is certified that error appears in the above-identified patent and that said Letters Patent is hereby corrected as shown below:

Column 18, Line 37, in Claim 10, delete "processor" and insert --one or more computers--.

Column 19, Line 44, in Claim 16, delete "processor" and insert --one or more computers--.

Column 20, Line 1, in Claim 16, after "determined", delete "relative displacements".

Signed and Sealed this  
Fifteenth Day of May, 2018

Andrei Iancu  
*Director of the United States Patent and Trademark Office*